United States Patent
Mosquera Donate et al.

(10) Patent No.: US 11,981,080 B2
(45) Date of Patent: May 14, 2024

(54) BUILD MATERIAL SUPPLY UNITS

(71) Applicant: Hewlett-Packard Development Company, L.P., Spring, TX (US)

(72) Inventors: Gerard Mosquera Donate, Sant Cugat del Valles (ES); Lluis Pare Barniol, Sant Cugat del Valles (ES); Albert Rodriguez Fernandez, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 474 days.

(21) Appl. No.: 17/416,357

(22) PCT Filed: Apr. 23, 2019

(86) PCT No.: PCT/US2019/028679
§ 371 (c)(1),
(2) Date: Jun. 18, 2021

(87) PCT Pub. No.: WO2020/219025
PCT Pub. Date: Oct. 29, 2020

(65) Prior Publication Data
US 2022/0072790 A1      Mar. 10, 2022

(51) Int. Cl.
*B29C 64/329*  (2017.01)
*B29C 64/153*  (2017.01)
*B33Y 30/00*   (2015.01)
*B33Y 40/10*   (2020.01)
*B65G 65/44*   (2006.01)

(52) U.S. Cl.
CPC .......... *B29C 64/329* (2017.08); *B29C 64/153* (2017.08); *B33Y 30/00* (2014.12); *B33Y 40/10* (2020.01); *B65G 65/44* (2013.01)

(58) Field of Classification Search
CPC ..... B29C 64/329; B29C 64/153; B65G 65/44; B33Y 30/00; B33Y 40/10
USPC ................. 222/196, 197–200, 220
See application file for complete search history.

(56) References Cited

U.S. PATENT DOCUMENTS

| | | | | |
|---|---|---|---|---|
| 1,459,840 | A * | 6/1923 | Mitchell | B06B 1/10 209/326 |
| 4,519,902 | A * | 5/1985 | Kinder | B01D 35/20 209/244 |
| 9,486,962 | B1 | 11/2016 | Dugan et al. | |
| 10,953,437 | B2 * | 3/2021 | Herzog | B07B 13/16 |
| 2005/0266161 | A1 * | 12/2005 | Medeiros | H01M 4/8605 427/457 |

(Continued)

FOREIGN PATENT DOCUMENTS

| | | |
|---|---|---|
| DE | 4400523 A1 | 7/1995 |
| DE | 102006056422 | 4/2008 |

(Continued)

*Primary Examiner* — Jeremy Carroll
(74) *Attorney, Agent, or Firm* — Shook, Hardy & Bacon L.L.P.

(57) ABSTRACT

According to one example there is provided a build material supply unit for additive manufacturing systems. The build material supply unit may comprise a sloping support surface for the build material, which has no hard edges, a mesh above the sloping support surface, and a vibrator to vibrate the mesh and cause the descent of build material.

15 Claims, 3 Drawing Sheets

(56) References Cited

U.S. PATENT DOCUMENTS

| | | | |
|---|---|---|---|
| 2015/0239013 A1* | 8/2015 | Convery | B07B 1/286 |
| | | | 209/269 |
| 2018/0141126 A1 | 5/2018 | Buller et al. | |
| 2020/0147884 A1* | 5/2020 | Flick | B29C 64/209 |
| 2021/0114296 A1* | 4/2021 | Hick | B29C 64/364 |
| 2022/0371273 A1* | 11/2022 | Chanclon Fernandez | |
| | | | B07B 1/28 |

FOREIGN PATENT DOCUMENTS

| WO | WO-2016030417 | 3/2016 |
|---|---|---|
| WO | WO-2019009905 | 1/2019 |
| WO | WO-2019022740 | 1/2019 |
| WO | WO-2019042681 | 3/2019 |

\* cited by examiner

BUILD MATERIAL SUPPLY UNITS

BACKGROUND

In additive manufacturing systems, such as 3D printers, three-dimensional objects are generated on a layer-by-layer basis. A layer of a build material, such as powder, may be laid out on a build platform and selectively solidified to form a layer of the object.

BRIEF DESCRIPTION OF THE DRAWINGS

Some non-limiting examples of the present disclosure will be described in the following with reference to the appended drawings, in which.

DETAILED DESCRIPTION

Figure 1:
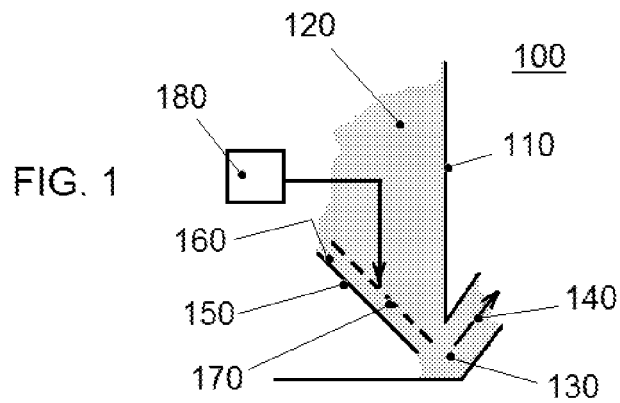
FIG. 1 is a very simplified cross section of a portion of a build material supply unit according to one example.

In 3D printers or other additive manufacturing technologies, parts are formed by providing successive layers of a build material, generally in powder form, on a build platform, and selectively solidifying each layer to create the final shape of the manufactured part.

Some 3D printing systems use build material that have a powdered, powder-like or granular, form. According to one example a suitable build material may be a powdered semi-crystalline thermoplastic material. One suitable material may be Nylon 12, which is available, for example, from Sigma-Aldrich Co. LLC. Another suitable material may be PA 2200 which is available from Electro Optical Systems EOS GmbH. In other examples other suitable build material may be used, including, for example, powdered metal materials, powdered plastics or polymer materials, such as for example thermoplastic polyurethane (TPU) and polypropylene (PP), powdered or powder-like composite materials, powdered or powder-like ceramic materials, powdered or powder-like glass materials, powdered or powder-like resin material, and the like. In some examples the powder may be formed from, or may include, short fibres that may, for example, have been cut into short lengths from long strands or threads of material.

A build material supply unit for a 3D printer may be removable from the 3D printer, i.e. it may be a separate unit that is inserted in the printer to generate one or more 3D objects and then removed for discharging the generated object(s), loading build material and/or other operations, or it may be integrated or permanently installed in the printer.

In some examples the build material supply unit may be part of a build unit also comprising other systems such as the build platform, which may be movable in the z-axis (vertically) to enable it to be lowered as each layer of build material formed thereon is processed by the 3D printer, a build material store containing build material, and a feed system to provide a quantity of the build material along a side of the build platform, to be spread over the build platform by a spreader, such as for example a horizontally movable roller or wiper blade. Such a build unit may itself be removable from the 3D printer, for example on a trolley.

In other examples, the build material supply unit may be a separate element from a build unit that comprises e.g. a build platform and spreader. For example, one of the build material supply unit and the build unit may be removable from the printer, while the other may be integrated in the printer.

The build material store of the build material supply unit may be below the build platform and build material may be supplied from an outlet at the bottom of the build material store to a higher level, for example by an auger screw conveyor of the build material supply unit, or of a separate device.

Various examples will now be described that provide a reliable and versatile build material supply unit for use in the generation of 3D objects by an additive manufacturing system, such as for example a 3D printing system.

Some examples of build material supply units provided in the present disclosure improve the continuous flow of build material during operation to generate a 3D object, and reduce stagnation of the build material on the support surfaces. This allows using of a broad range of build materials having different properties and therefore it increases the versatility of the system. Examples disclosed herein also enable simple and cost effective manufacture, assembly and maintenance of build material supply units.

FIG. 1 shows a very schematic illustration in cross section of a portion of a build material supply unit 100 according to one example, for an additive manufacturing system such as a 3D printer. For clarity reasons not all the elements of the build material supply unit 100 are shown.

The build material supply unit may comprise a build material store 110 for holding an amount of build material 120 for generating a 3D object: for example, a powdered build material. At the bottom of the build material store 110 there may be an outlet 130, from which build material is discharged by a conveyor, as shown by arrow 140, to be employed in the manufacture of a 3D object on the build platform.

Also at the bottom or in the lower section of the build material store 110 there may be a sloping and concave support surface 160 for the build material 120, formed by an integral part or body 150, which in some examples may be a part or body of plastic material, for example an injection moulded plastic part.

When the build material supply unit 100 is in an operating position, such as shown in FIG. 1, the support surface 160 slopes downwards, towards the outlet 130, to help conveying to the outlet 130 the build material 120 contained in the build material store 110. For example, the sloping and concave support surface 160 may converge towards the build material outlet 130.

By "concave" it is meant that the support surface 160 has an overall shape resembling a portion of a funnel or hopper, with ramps or slopes converging from at least two sides, to help conveying towards the outlet 130 most of the build material 120 above the support surface 160. In some examples the support surface 160 may have three ramps or slopes converging towards the outlet 130 from three sides. The support surface 160 being "concave" does not mean that it has a curvature in the direction of the slope, and it does not mean that it has a bottom where build material may collect.

For example, the support surface 160 may have a central ramp or sloping region, for example a flat central region, generally in front of the outlet 130, and two side ramps or sloping regions. The side regions may extend at an angle with respect to the central region such that they slope in different directions from that of the central region, with the slopes of the central and side regions all converging towards the outlet 130, thus forming a concave, hopper-like shape.

In some examples, regions of the support surface 160 may be inclined at angles of between 20 and 70 degrees with respect to a horizontal direction.

The support surface 160 may have flat and/or curved regions.

In some examples the sloping and concave support surface 160 has no hard edges. For example, transition areas between a central region and side regions of the support surface 160 may be rounded, i.e. in the form of soft edges. In other examples, substantially all the support surface 160 around the position of the outlet 130 may be curved. For example, the support surface may be generally frustoconical, and/or have different curvatures in different regions.

By "hard edge" it is meant an intersection between two surfaces where the radius of curvature of the surface at the intersection is less than 10 mm.

Since build materials, especially relatively cohesive materials such as polypropylene (PP) or thermoplastic polyurethane (TPU), tend to remain adhered in canals at the intersections between surfaces, the absence of hard edges on the support surface 160 reduces the risk of stagnant build material remaining on the support surface, and this improves the capacity of the build material supply unit 100 to work with a broad range of build materials.

Manufacturing the support surface 160 as an integral part by injection moulding improves the flexibility of the design, allowing for example suitable slope angles in substantially all the support surface, which improves the flow behaviour of the build material, and also enables forming radiuses well above 10 mm in the intersections between different sloping regions and between the sloping regions and other portions of the integral part 150.

In other examples, an integral part 150 may also be manufactured in metal, for example stainless steel, with radiuses above 10 mm at the intersections between sloping regions that are oriented in different directions.

As also shown in FIG. 1, in some examples the build material supply unit 100 comprises a mesh 170 inside the build material store 110 and therefore in contact with the build material 120, and a vibrator 180 to vibrate the mesh 170 and cause the descent of build material 120. The mesh 170 may be above at least part of the support surface 160, and is intended to vibrate to promote the continuous and smooth descent and discharge of the build material 120. In some examples the mesh 170 may cover at least 25% of the support surface 160; in some examples it may cover at least 50% of the support surface 160, and in some examples it may cover at least 80% of the support surface.

The mesh 170 may be parallel to the support surface 160 at least in some regions: for example, in FIG. 1 the mesh 170 is shown parallel to the support surface 160 in front of the outlet 130, which in the shown schematic example is depicted substantially flat, at least in the sloping direction; it some example it may have a curvature in the direction perpendicular to the plane of the drawing, as discussed below.

In some examples, and as also illustrated very schematically in FIG. 1, the build material supply unit 100 comprises the vibrator 180, which is connected to the mesh 170 to cause the vibration of the mesh 170. In some examples, the vibrator 180 may be mounted underneath the support surface 260, and be connected to the mesh 170 by fasteners through the surface 260. In other examples, the vibrator 180 may be mounted on a wall or structure of the build material supply unit 100, separate from the integral part 150.

A build material supply unit 200 according to some examples will be described with reference to FIG. 2, which is a very schematic vertical cross section view across the build material supply unit, and to FIG. 3, which shows a simplified isometric view of an example integral part 250 forming support surfaces 260 for the build material.

Figure 2:
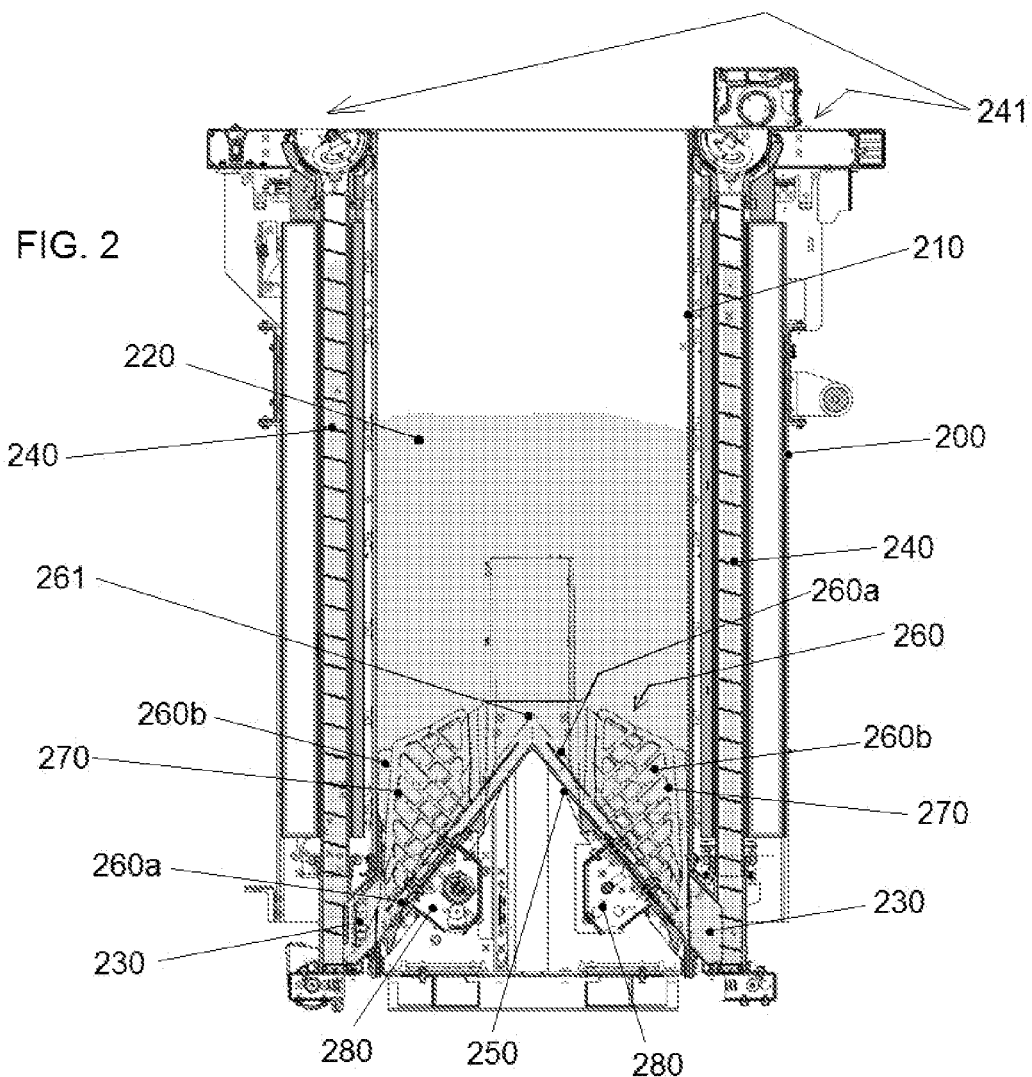
FIG. 2 is a simplified cross section of a build material supply unit according to one example.

A build material supply unit 200 such as illustrated in FIG. 2 may comprise a build material store 210 with two outlets 230, from which build material 220 is elevated by two respective conveyors 240 towards a feeding and spreading system generally and very schematically indicated at 241.

For clarity reasons not all the elements of the build material supply unit 200 are shown in FIG. 2. For example, build material supply unit 200 may also comprise in some examples a build platform and a corresponding mechanism for moving the build platform vertically, which are not shown. In other examples, the build platform may be part of a different unit.

Figure 3:
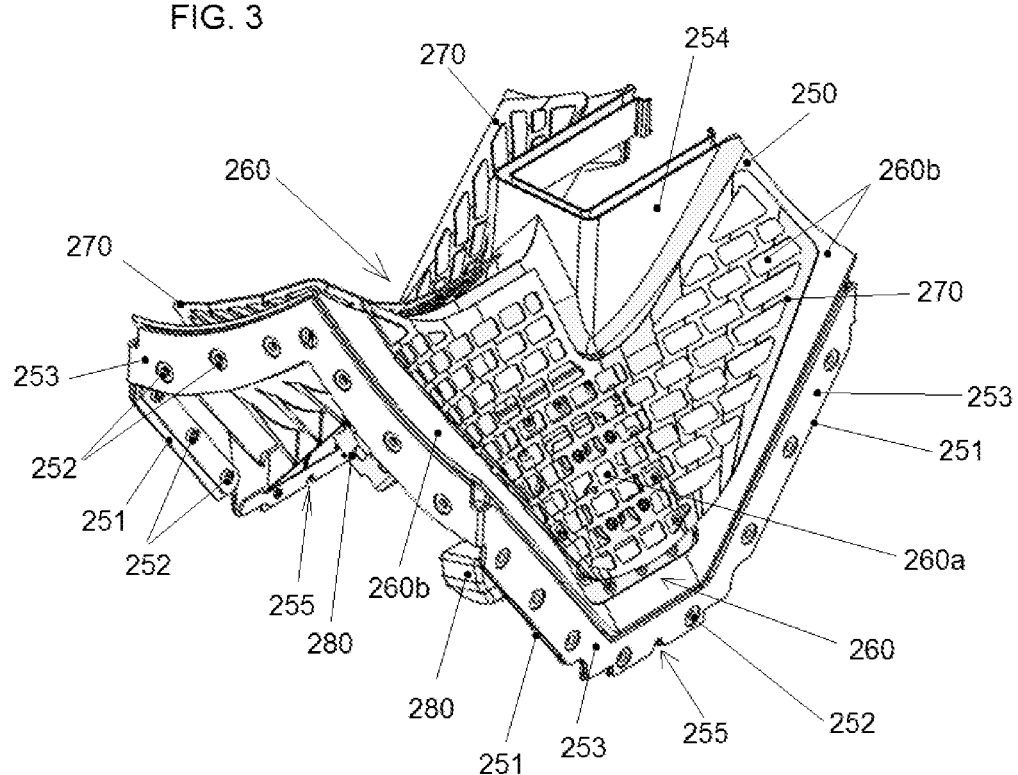
FIG. 3 is a simplified isometric view of a portion of a build material supply unit, for example the build unit of FIG. 2, according to one example.

In the lower section of the build material store 210 there may be an integral part 250, such as that shown in perspective view in FIG. 3, for example an injection moulded plastic part, forming two sloping and concave support surfaces 260 for the build material 220. The two sloping and concave support surfaces 260 may have opposite sloping directions, each facing one of the outlets 230, with a ridge 261 between them.

In FIGS. 2 and 3 each support surface 260 may comprise in some examples a central region 260a, substantially in front of the outlet 230, and two side regions 260b at either sides of the central region 260a. One of the side regions 260b of each support surface 260 is visible in the cross section view of FIG. 2. In some examples the central region 260a may be flat, and the side regions 260b may be curved, to form with the central region 260a a funnel shape. In other examples the side regions 260b may be shaped with a number of successive flat portions at an angle and with a curved transition between each other, to form a generally rounded shape.

A mesh 270 may be provided above each support surface 260, and connected to a corresponding vibrator 280. Vibrators 280 may be on the underside of the corresponding support surface 260, as shown, or attached elsewhere on the structure of the build material supply unit 200. Examples of the mounting of a vibrator on the build material supply unit and its connection to a mesh, which may be suitable for build material supply units such as shown in FIGS. 1 to 3, will be described later on.

The mesh 270 may be parallel to at least part of the support surface 260, for example to the central region 260a of the support surface, which in some examples, such as illustrated in FIGS. 2 and 3, may be substantially flat in the sloping direction. The mesh 270 may also extend above the side regions 260b of the support surface 260, and in some examples it may be substantially parallel to the support surface 260 also in the side regions 26b.

In some implementations, for example if the mesh is connected to the vibrator in the area of the central region 260a, as in FIGS. 2 and 3, the mesh may extend substantially following the shape of the support structure, but the distance between the mesh 270 and the support structure 260 may be smaller on the central region 260a and progressively increase towards the two opposite free ends of the mesh 270 on the side regions 260b: the mesh 270 may therefore be closer to the support surface 260 in the central region 260a than at the ends of the side regions 260b that are remote from the central region 260a. This may allow accommodating the larger amplitude of vibration of the free ends of the mesh 270.

In some examples, the minimum distance between the mesh 270 and the underlying support surface 260 is between 5 mm and 20 mm. In some examples the maximum distance between the mesh 270 and the underlying support surface 260 is less than 30 mm. In some examples, the difference between the maximum and the minimum distance between the mesh 270 and the underlying support surface 260 is less than 20 mm.

A mesh parallel or substantially parallel to the support surface reduces the pressure in the volume of build material below the mesh, preserving free flowing conditions for the build material in this area, and also increases the minimal span of the dome that can be generated without contacting with moving elements. This enables reliable operation with cohesive materials such as TPU.

Furthermore, a mesh close to the support surface reduces the risk of stagnant build material in-between, so it simplifies the cleaning of the build material supply unit when changing the build material and it reduces the risk that stagnant or aged build material ends up in a manufactured object.

FIG. 3 shown further details of an integral part 250 according to some examples.

In some examples the integral part 250 may be provided with lips 251, for example around at least part of its periphery, for example around the upper edges of the integral part 250, for attaching the integral part 250 to the walls of the build material store 210 and adjusting it inside the build material store 210.

The lips 251 may be formed together with the rest of the integral part 250, for example when the latter is a plastic injection moulded integral part.

The lips 251 may be hinged to a periphery of the integral part 250, for example along the upper edges of the integral part 250, so the lips 251 can pivot with respect to the rest of the integral part 250. In case of a plastic injection moulded integral part 250, a hinge for a lip 251 may be formed as a thinner section of plastic material. The lips 251 may be provided with holes 252, allowing attachment of the lips 251 to the walls of the build material store 210 with screws or other fasteners.

Sealing joints 253, for example foam sealing joints, may be provided between the lips 251 and the walls of the build material store 210 to prevent leaks of build material 220 outside the build material store 210.

The lips 251 are useful for mounting and fitting the integral part 250 inside the build material store 210.

When the build material supply unit 200 comprises a build platform (not shown), some implementations of the integral part 250 may also comprise a vertical conduit 254 (visible in FIG. 3) intended to surround the mechanism for mounting and displacing the build platform (not shown in the figures). The integral part 250 may also be provided in some examples with datum references 255 (visible in FIG. 3) to facilitate accurate positioning and attachment of the integral part 250 inside the build material store 210.

In some examples (not shown), a build material supply unit according to the present disclosure may have a structure similar to that shown in FIGS. 2 and 3, but with one outlet 230 and one conveyor 240 instead of two, and therefore one sloping and concave support surface 260, with corresponding mesh 270 and vibrator 280.

In build units according examples of the present disclosure, a mesh and a corresponding vibrator may be mounted through a diaphragm or dampening plate that is attached to the build material supply unit. In some examples, the diaphragm or dampening plate may be attached to the integral part forming the sloping and concave support surface; in other examples, the diaphragm or dampening plate may be attached to other parts of the build material supply unit.

Mounting the vibrator and mesh on the structure of the build material supply unit with a dampening plate allows reducing the vibration transmitted to the structure, thus reducing the impact on the quality of the object being manufactured and also protecting the part of the structure to which the vibrator and mesh are attached, such as for example the support surface.

Furthermore, the dampening plate may be of different materials, geometry and properties, e.g. elastic and ultimate strength and modulus, from the support surface or other structure of the build material supply unit, and this increases the versatility of the system. In particular, the dampening plate may be more flexible than the structure to which it is attached.

For example, the amplitude of vibration of the mesh may be adjusted depending e.g. on the intended performance of the system and/or on the properties of the build materials to be employed: e.g. larger amplitudes of vibration may be enabled in case of more cohesive build materials which tend to form steep walls and domes. For some build materials and/or performances it may be useful to provide a dampening plate with a relatively low elastic modulus to transmit a relevant proportion of the vibration to the support surface or structure of the build material supply unit.

A dampening plate may be attached to the structure in a removable way, so in case of damage due to fatigue, heavy usage, etc. it may be replaced, without the structure of the build material supply unit being affected.

Example of suitable materials for the dampening plate may be stainless steel or spring steel. Spring steel enables thinner plates to be employed safely with large amplitudes of vibration.

Figure 4:
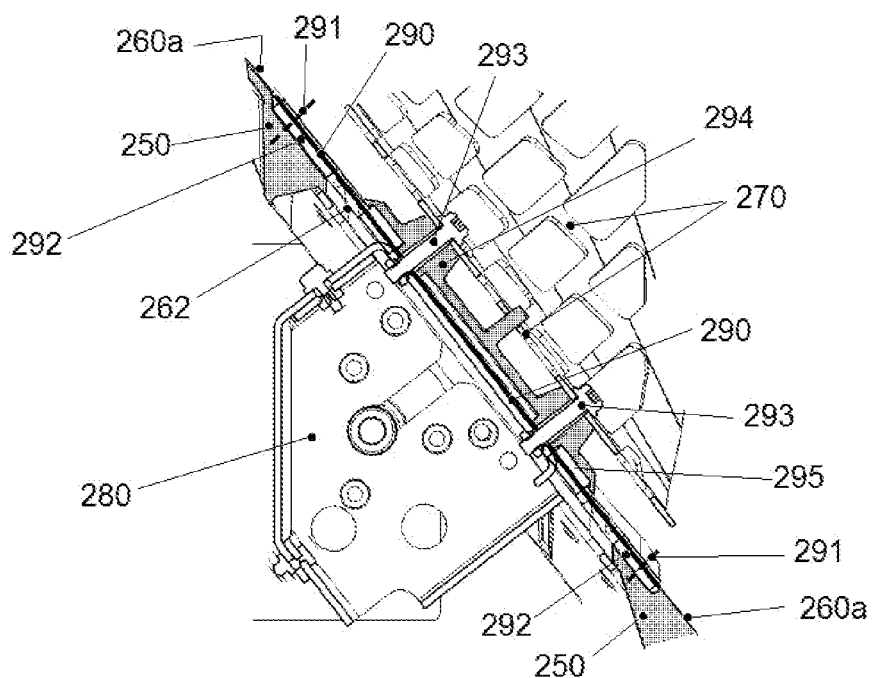
FIG. 4 is a simplified, enlarged view in cross section of a detail of a build material supply unit according to one example.

FIG. 4 is a simplified cross section of the central region 260a of one of the support surfaces 260 of FIG. 3, showing an example of the mounting of the mesh 270 and vibrator 280 using a diaphragm or dampening plate 290 attached to the support surface 260. The assembly is described in combination with example implementations such as those described in relation with FIGS. 2 and 3, but may be applied to other build material supply units having a support surface for the build material and a mesh above the support surface, for example as in FIG. 1.

As shown in FIG. 4, the sloping and concave support surface 260 formed by the integral part 250 may have an opening 262, for example in the central region 260a, and the dampening plate 290 may be attached to the support surface to close all the opening 262, for example with screws 291, and with the interposition of a sealing joint 292. This makes the dampening plate 290 easily removable. The dampening plate may have a thickness between 0.3 mm and 2 mm and may be for example made of stainless steel or spring steel.

The mesh 270 and the vibrator 280 may be placed on opposite sides of the dampening plate 290, and the vibrator 280, the dampening plate 290 and the mesh 270 are tightened together, for example by screws 293, through openings in the dampening plate 290.

As shown in FIG. 4, in some examples a spacer 294 and suitable sealing joints 295 may be provided between the dampening plate 290 and the mesh 270. The spacer 294 is designed to set the desired distance between the mesh 270 and the support surface 260.

In some examples the opening 262 may be generally rectangular, and the dampening plate 290 may be attached in multiple points all around the opening 262.

Examples of a vibrating mesh mounted parallel or substantially parallel to an underlying build material support surface, as disclosed herein, may also be used with different build material supply units or support structures for powdered materials from those of the present disclosure.

Similarly, examples of a mesh and vibrator mounted through a diaphragm or dampening plate as disclosed herein to the structure of a build material supply unit for an additive manufacturing system, for example to a support surface, may also be used with different build material supply units or support structures for powdered materials from those of the present disclosure. Furthermore, a mesh parallel to an underlying support surface and a corresponding vibrator may be mounted with a dampening plate as disclosed.

The present disclosure also provides a bottom insert for a build material supply unit of an additive manufacturing system such as a 3D printer, i.e. an insert to be mounted at the bottom or substantially at the bottom of a build material supply unit after being assembled.

The bottom insert may comprise an integral part or body of plastic material, for example an injection moulded plastic part, forming a sloping support surface for the build material; a mesh above the support surface; and a vibrator to vibrate the mesh and cause the descent of build material. The support surface may have a central region and two side regions and no hard edges in the transition between the central region and the side regions.

Examples of inserts with an integral plastic part or body forming the sloping support surface for the build material enable cost-effective production of a sloping support surface without joints that are manually sealed with silicone between different parts of the support surface, which improves the sealing performance of the build material supply unit.

Examples of such inserts also enable a flexible design of the support surface, e.g. substantially avoiding areas of reduced slope and hard edges and providing features such as reinforcing ribs to improve stiffness of the support surface, lips to attach the insert to the build material supply unit, openings, datum references, and the like. Components such as the mesh and vibrator, sealing joints, etc. may be assembled together on the insert prior to mounting the insert in the build material supply unit.

Integral part 250 shown in FIG. 3, with the meshes 270 and vibrators 280, as well as variants thereof such as described above, may be examples of a bottom insert. Other implementations of the insert may involve for example a single sloping support surface 260 instead of two, or other shapes of the support surface 260.

Examples of such a bottom insert may be employed in build material supply units according to any of the examples disclosed herein.

Figure 5A:
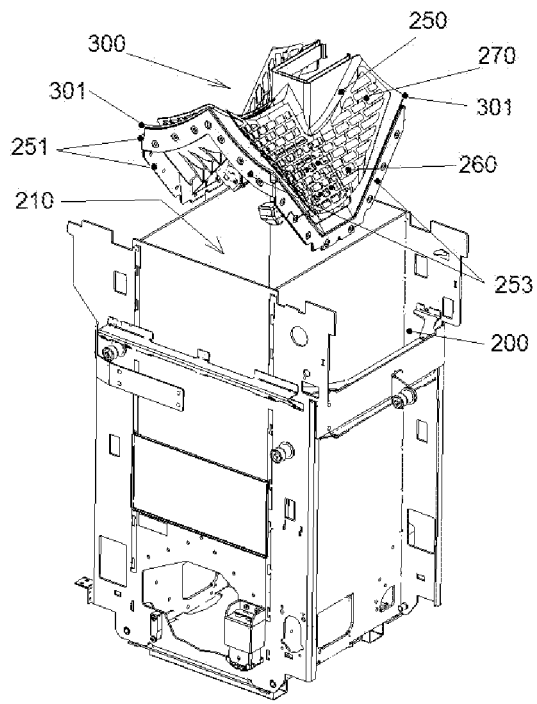
FIGS. 5a and 5b are simplified isometric views of a build material supply unit during assembly of a bottom insert according to one example.
Figure 5B:
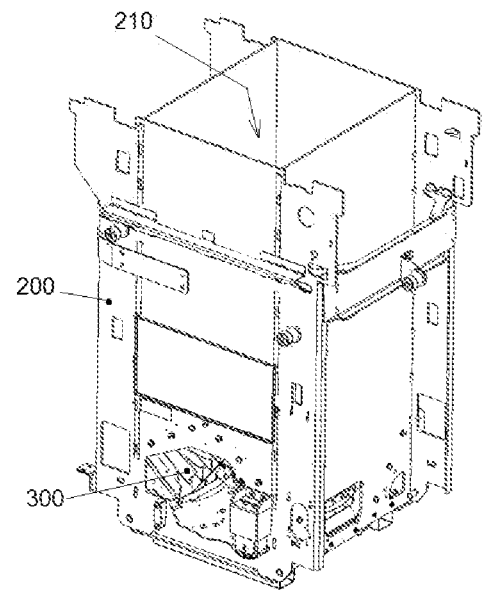

FIGS. 5a and 5b illustrate the assembly of a plastic insert 300 according to one example in the structure of a build material supply unit 200. FIG. 5a shows a plastic insert 300, such as depicted in FIG. 3, about to be inserted from above into the build material store 210 of the build material supply unit 200. In the example of FIG. 5a the insert 300 comprises lips 251 and sealing joints 253.

The plastic insert 300 may have a degree of flexibility suitable to safely adapt to the inner shape of the build material store 210, and may therefore slide with certain ease into the build material store 210. The lips 251 enable attaching and adjusting the insert in position inside the build material store 210 compensating for small dimensional differences, and with sealing joints 253 provided around the perimeter, between the insert 300 and the wall of the build material store 210.

FIG. 5b shows the build material supply unit 200 after the insert 300 has been introduced into the build material store 210 and positioned with suitable datum references. The lips 251 of the insert 300 may then be attached to the walls of the build material supply unit, for example with screws. Silicone may then be applied from the underside of the insert to seal a few points between the walls of the build material store 210 and the insert, e.g. at the corners 301 of the build material store 210.

Figure 6:
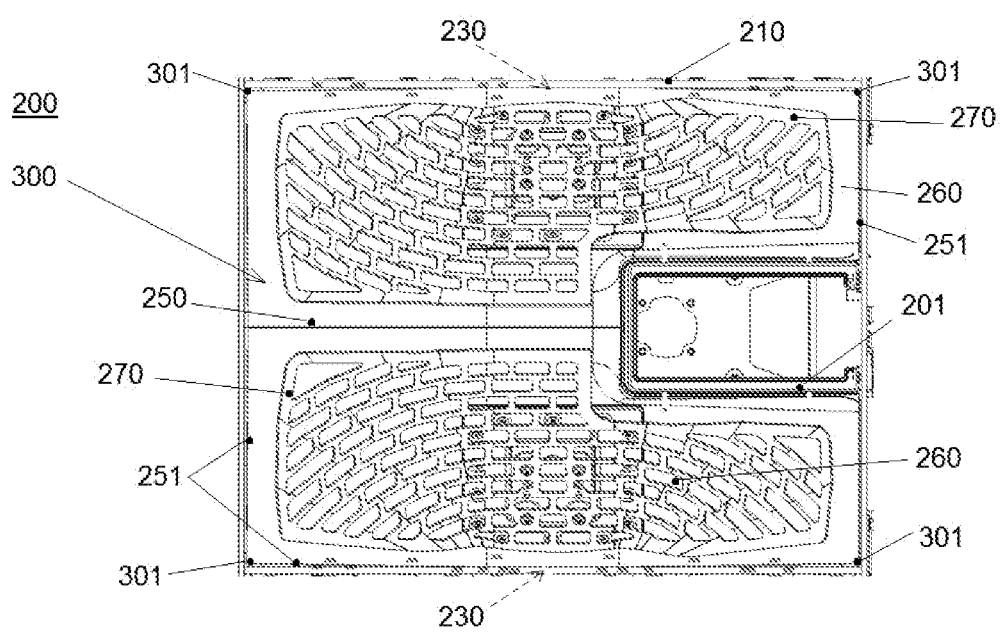
FIG. 6 is a simplified plan view from above of the interior of a build material supply unit according to an example.

FIG. 6 shows a view from above of the interior of the build material store 210 of the build material supply unit 200, with outlets 230 at the bottom of two of its sides, a column 201 for housing the mechanism for moving the build platform (not shown) and an insert 300 at the bottom. In the example shown, the insert 300 comprises integral part 250, with lips 251 around the periphery, two sloping and concave support surfaces 260 each converging towards one of the outlets 230, a mesh 270 above each support surface 260. Also visible are the four corners 301 of the insert 300, where sealing silicone has been applied from the underside.

In examples of the plastic insert 300, the integral part or body 250 may be made by injection moulding. For example, it may be made of a polycarbonate (PC), which can undergo relatively large plastic deformations without cracking or breaking, for example of a glass fiber reinforced polycarbonate. In some examples, the integral part or body may be made of conductive plastic and connected to ground, to avoid static charging.

Although a number of particular implementations and examples have been disclosed herein, further variants and modifications of the disclosed devices and methods are possible. For example, not all the features disclosed herein are included in all the implementations, and implementations comprising other combinations of the features described are also possible.

The invention claimed is:

1. A build material supply unit for an additive manufacturing system, the build material supply unit comprising:
a build material store;
an integral part forming a sloping and concave support surface for the build material, at the bottom of the build material store, the support surface having no hard edges;
a mesh above the support surface; and
a vibrator to vibrate the mesh and cause the descent of build material.

2. The build material supply unit of claim 1, wherein the integral part is of plastic material.

3. The build material supply unit of claim 1, wherein the integral part comprises a lip for attaching the integral part to a wall of the build material store.

4. The build material supply unit of claim 3, wherein the lip is hinged to a periphery of the integral part and can pivot with respect to the rest of the integral part.

5. The build material supply unit of claim 3, comprising a sealing joint between the lip and the wall of the build material store.

6. The build material supply unit of claim 1, wherein the sloping and concave support surface converges towards a build material outlet at the bottom of the build material supply unit.

7. The build material supply unit of claim 1, wherein the sloping and concave support surface comprises a flat central region and two side regions.

8. The build material supply unit of claim 1, wherein the mesh is closer to the support surface in the central region of the support surface than at the ends of the side regions of the support surface that are remote from the central region.

9. The build material supply unit of claim 1, wherein the mesh is parallel to at least part of the support surface.

10. The build material supply unit of claim 1, wherein the mesh covers at least 25% of the support surface.

11. The build material supply unit of claim 1, wherein the vibrator and the mesh are mounted on the build material supply unit through a dampening plate that is attached to the build material supply unit.

12. The build material supply unit of claim 11, wherein the support surface of the integral part has an opening, the dampening plate is attached to the support surface and closes the opening, and the vibrator and the mesh are on opposite sides of the dampening plate, and wherein the vibrator, the dampening plate and the mesh are tightened together.

13. The build material supply unit of claim 1, wherein the integral part forms two sloping and concave support surfaces for the build material, with opposite sloping directions and a ridge between the two sloping and concave support surfaces, and has a mesh above each support surface.

14. A build material supply unit for an additive manufacturing system, the build material supply unit comprising:
- a sloping support surface for the build material, the sloping support surface having no hard edges;
- a mesh above the sloping support surface and extending parallel to at least part of the sloping support surface; and
- a vibrator to vibrate the mesh and cause the descent of build material.

15. A bottom insert for a build material supply unit of an additive manufacturing system, the bottom insert comprising:
- an integral part of plastic material forming a sloping support surface for the build material, the sloping support surface having a central region and two side regions and no hard edges in the transition between the central region and the side regions;
- a mesh above the sloping support surface, and
- a vibrator to vibrate the mesh and cause the descent of build material.

* * * * *